United States Patent
Sikka et al.

(10) Patent No.: US 12,380,676 B2
(45) Date of Patent: Aug. 5, 2025

(54) SIMPLIFYING CONVOLUTIONAL NEURAL NETWORKS USING AGGREGATED REPRESENTATIONS OF IMAGES

(71) Applicant: VIANAI SYSTEMS, INC., Palo Alto, CA (US)

(72) Inventors: Vishal Inder Sikka, Los Altos Hills, CA (US); Kevin Frederick Dunnell, Waltham, MA (US)

(73) Assignee: VIANAI SYSTEMS, INC., Palo Alto, CA (US)

(*) Notice: Subject to any disclaimer, the term of this patent is extended or adjusted under 35 U.S.C. 154(b) by 536 days.

(21) Appl. No.: 17/831,133

(22) Filed: Jun. 2, 2022

(65) Prior Publication Data

US 2023/0215139 A1    Jul. 6, 2023

Related U.S. Application Data

(60) Provisional application No. 63/297,012, filed on Jan. 6, 2022.

(51) Int. Cl.
| | |
|---|---|
| *G06V 10/764* | (2022.01) |
| *G06N 3/08* | (2023.01) |
| *G06V 10/72* | (2022.01) |
| *G06V 10/74* | (2022.01) |
| *G06V 10/75* | (2022.01) |
| *G06V 10/774* | (2022.01) |
| *G06V 10/82* | (2022.01) |

(52) U.S. Cl.
CPC ............ *G06V 10/764* (2022.01); *G06N 3/08* (2013.01); *G06V 10/72* (2022.01); *G06V 10/74* (2022.01); *G06V 10/751* (2022.01); *G06V 10/761* (2022.01); *G06V 10/774* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2018/0260414 A1* | 9/2018 | Gordo Soldevila | .. G06F 16/532 |
| 2021/0089906 A1* | 3/2021 | Lazovich | ............. G06V 10/776 |
| 2022/0405600 A1* | 12/2022 | Condurache | ........ G06F 18/2148 |

OTHER PUBLICATIONS

International Search Report for Application No. PCT/US2022/082333 dated Apr. 26, 2023.

(Continued)

*Primary Examiner* — Leon Flores
(74) *Attorney, Agent, or Firm* — Artegis Law Group, LLP

(57) ABSTRACT

One embodiment of the present invention sets forth a technique for simplifying a trained machine learning model. The technique includes determining a first set of images associated with a first output class predicted by the trained machine learning model. The technique also includes generating a first aggregated representation of the first set of images, wherein the first aggregated representation includes a first plurality of representative pixel values for a plurality of pixel locations included in the first set of images. The technique further includes generating a simplified representation of the trained machine learning model that includes a first mapping of the first aggregated representation to the first output class, wherein the first mapping indicates that the trained machine learning model predicts the first output class for one or more input images.

20 Claims, 6 Drawing Sheets

(56) References Cited

OTHER PUBLICATIONS

International Search Report for Application No. PCT/US2022/082332 dated May 8, 2023.
Chandrashekar et al., "CRL: Class Representative Learning for Image Classification", Feb. 16, 2020, pp. 1-15.
Non Final Office Action received for U.S. Appl. No. 17/831,139 dated Sep. 29, 2024, 23 pages.
Guo et al, "BoolNet: Minimizing The Energy Consumption of Binary Neural Networks", arXiv:2106.06991, Jun. 13, 2021, pp. 1-15.
Shenwai, Tanushree, "MIT Researchers Open-Sourced 'MADDNESS': An AI Algorithm That Speeds Up Machine Learning Using Approximate Matrix Multiplication (AMM)", Retrieved from https://www.marktechpost.com/2021/10/07/mit-researchers-open-sourced-maddness-an-ai-algorithm-that-speeds-up-machine-learning-using-approximate-matrix-multiplication-amm/, on Apr. 14, 2022, Oct. 7, 2021, 4 pages.
Blalock et al., "Multiplying Matrices Without Multiplying", arXiv:2106.10860, Proceedings of the 38 th International Conference on Machine Learning, PMLR 139, Jun. 21, 2021, 22 pages.
Blalock et al., "Bolt: Accelerated Data Mining with Fast Vector Compression", arXiv:1706.10283, DOI: 10.1145/3097983.3098195, In Proceedings of KDD'17, Aug. 13-17, 2017, 9 pages.
Blalock et al., "Bolt: Accelerated Data Mining with Fast Vector Compression", Retrieved from https://github.com/dblalock/bolt/blob/master/assets/bolt-slides.pdf, on Apr. 14, 2022, 30 pages.
Non Final Office Action received for U.S. Appl. No. 17/831,177 dated Jan. 21, 2025, 30 pages.
Final Office Action received for U.S. Appl. No. 17/831,139 dated Apr. 10, 2025, 24 pages.

* cited by examiner

SIMPLIFYING CONVOLUTIONAL NEURAL NETWORKS USING AGGREGATED REPRESENTATIONS OF IMAGES

CROSS-REFERENCE TO RELATED APPLICATIONS

This application claims benefit of United States Provisional Patent Application titled "APPROACH FOR SIMPLIFYING CONVOLUTIONAL NEURAL NETWORKS," filed Jan. 6, 2022, and having Ser. No. 63/297,012. The subject matter of this related application is hereby incorporated herein by reference.

BACKGROUND

Field of the Various Embodiments

The various embodiments relate generally to computer science and machine learning and, more specifically, to techniques for simplifying convolutional neural networks using aggregated representations of images.

DESCRIPTION OF THE RELATED ART

Non-quantized machine learning models are commonly trained to generate or predict classes, numeric values, images, audio, text, and/or various types of attributes. For example, non-quantized neural networks could use floating point numbers to represent inputs, weights, or activations to achieve a high-level of accuracy in the resulting computations. As non-quantized machine learning models grow in size and complexity, these models require increasing amounts of power, computational resources (e.g., storage, working memory, cache, and processor speed), network bandwidth (e.g., for transferring a machine learning model to a device or updating a machine learning model), and/or latency to execute. These requirements limit the ability to use the machine learning models in devices or environments with limited memory, power, network bandwidth, and/or computational capabilities.

To address the above limitations, various compression techniques have been developed to enable machine learning models to be used with a wider range of devices and hardware platforms. For example, a neural network can be modified or quantized to use lower precision numbers (e.g., integers) when performing various computations. As a general matter, a quantized neural network is less resource intensive and incurs less latency than a corresponding non-quantized neural network. Accordingly, the quantized neural network typically requires less memory, power, network bandwidth, and computational resources than the corresponding non-quantized neural network.

One drawback of conventional techniques for compressing machine learning models is the tradeoff between the amount a given machine learning model is compressed and the accuracy of the resulting compressed model. In this regard, compressing a machine learning model a certain amount can reduce the resource overhead and latency associated with the machine learning model without materially decreasing the accuracy of the machine learning model. However, when a machine learning model is compressed too much, the accuracy of the machine learning model can become adversely impacted, thereby limiting the usefulness of the compressed model.

Another drawback of conventional techniques for compressing machine learning models is that the size and complexity of a compressed machine learning model is a function of the size and complexity of the corresponding uncompressed machine learning model. For example, the level of compression applied to a given neural network could be expressed as a compression ratio between the size of the uncompressed version of that neural network and the size of the compressed version of the neural network. Accordingly, a compressed machine learning model can still be too large or complex to run on a device or environment with limited memory, power, network bandwidth, and/or computational capabilities.

As the foregoing illustrates, what is needed in the art are more effective techniques for compressing machine learning models.

SUMMARY

One embodiment of the present invention sets forth a technique for simplifying a trained machine learning model. The technique includes determining a first set of images associated with a first output class predicted by the trained machine learning model. The technique also includes generating a first aggregated representation of the first set of images, where the first aggregated representation includes a first plurality of representative pixel values for a plurality of pixel locations included in the first set of images. The technique further includes generating a simplified representation of the trained machine learning model that includes a first mapping of the first aggregated representation to the first output class, wherein the first mapping indicates that the trained machine learning model predicts the first output class for one or more input images.

One technical advantage of the disclosed techniques relative to the prior art is that, with the disclosed techniques, a simplified representation of a trained machine learning model is generated that includes a mapping between a compact representation of a set of images and an output class. During operation, the mapping is used instead of the trained machine learning model to predict the output class for certain types of input images. With this approach, the size and complexity of the simplified representation of the trained machine learning model is independent of the size and complexity of the actual trained machine learning model, which allows the trained machine learning model to be compressed beyond the point at which conventional compression techniques cause the accuracy of the compressed model to be adversely impacted. Another technical advantage of the disclosed techniques is the ability to perform machine learning inference operations via efficient "lookup" operations using the mapping based on pixel values in an input image. Consequently, machine learning inference operations performed based on the disclosed techniques can be faster and incur less resource overhead relative to conventional approaches that require inference operations to be performed by compressed machine learning models that are proportional in size and complexity to their corresponding uncompressed machine learning models. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
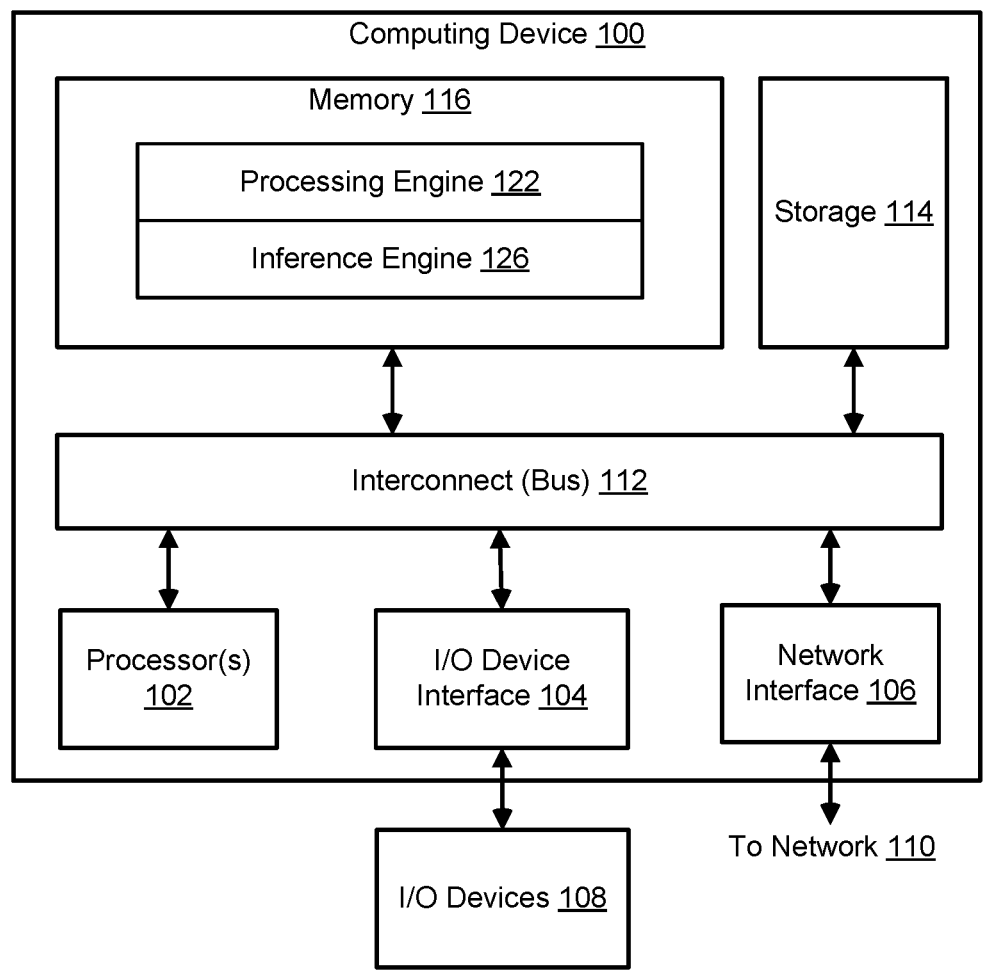
FIG. 1 illustrates a computing device configured to implement one or more aspects of various embodiments.

FIG. 1 illustrates a computing device 100 configured to implement one or more aspects of the present invention. Computing device 100 includes a desktop computer, a laptop computer, a smart phone, a personal digital assistant (PDA), tablet computer, server computer, or any other type of computing device configured to receive input, process data, and optionally display images, and is suitable for practicing one or more embodiments of the present invention. Computing device 100 is configured to run a processing engine 122 and an inference engine 126 that reside in a memory 116.

It is noted that computing device 100 described herein is illustrative and that any other technically feasible configurations fall within the scope of the present invention. For example, multiple instances of processing engine 122 and inference engine 126 could execute on a set of nodes in a data center, cluster, or cloud computing environment to implement the functionality of computing device 100. In another example, processing engine 122 and inference engine 126 could be implemented together and/or separately using one or more hardware and/or software components or layers.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of receiving input, such as a keyboard, a mouse, a touchpad, and/or a microphone, as well as devices capable of providing output, such as a display device and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Processing engine 122 and inference engine 126 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including processing engine 122 and inference engine 126.

Processing engine 122 and inference engine 126 include functionality to simplify a convolutional neural network (CNN) and/or another type of trained machine learning model that predicts classes associated with images. As described in further detail below, processing engine 122 generates one or more simplified representations of the machine learning model based on predictions of classes outputted by the trained machine learning model from various images. Each simplified representation includes one or more mappings corresponding to one or more output classes predicted by the machine learning model. Each mapping includes a compact representation of a set of images and a common class predicted by the machine learning model from the set of images.

Inference engine 126 uses the simplified representation(s) of the trained machine learning model to generate predictions for additional images. More specifically, inference engine 126 compares each image to the compact representations mapped to different classes within a given simplified representation of the machine learning model. When the comparison indicates that pixel values in the image are highly similar to or "fall within" the pixel values in a compact representation, inference engine 126 determines that the image is to be assigned the class to which the compact representation is mapped. As a result, the simplified representation(s) of the machine learning model can be used to perform inference related to the machine learning model without executing the machine learning model, thereby reducing resource overhead associated with performing inference using the machine learning model without significantly impacting the accuracy of the machine learning model.

Simplifying Convolutional Neural Networks

Figure 2:
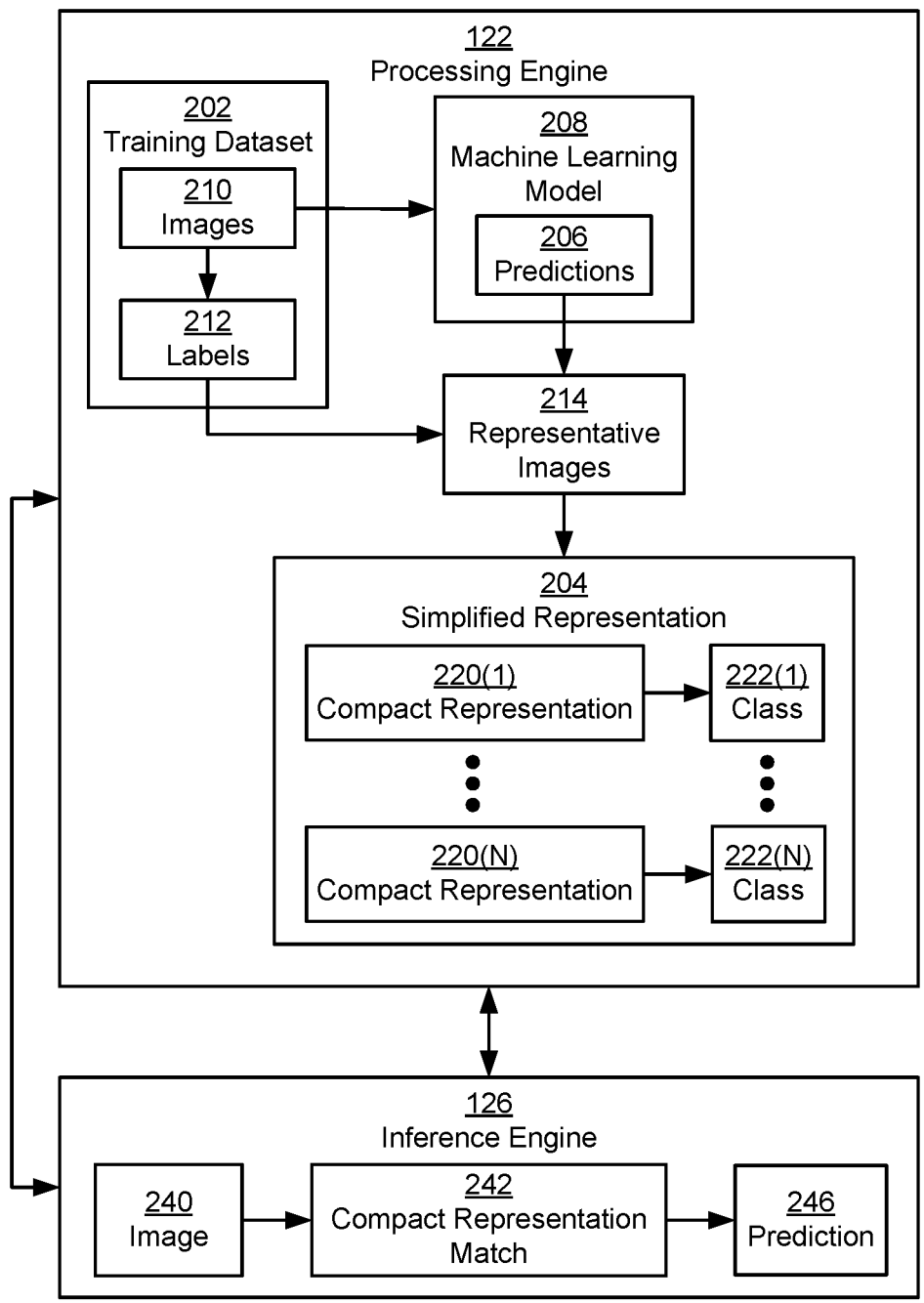
FIG. 2 is a more detailed illustration of the processing engine and inference engine of FIG. 1, according to various embodiments.

FIG. 2 is a more detailed illustration of processing engine 122 and inference engine 126 of FIG. 1, according to various embodiments. As mentioned above, processing engine 122 is configured to generate a simplified representation 204 of a trained machine learning model 208, and inference engine 126 is configured to use the simplified representation to perform inference related to machine learning model 208. Each of these components is described in further detail below.

Machine learning model 208 includes a number of learnable parameters and an architecture that specifies an arrangement, a set of relationships, and/or a set of computations related to the parameters. For example, machine learning model 208 could include one or more recurrent neural networks (RNNs), convolutional neural networks (CNNs), deep neural networks (DNNs), deep convolutional networks (DCNs), and/or other types of artificial neural networks or components of artificial neural networks. Machine learning model 208 could also, or instead, include a logistic regression model, support vector machine, decision tree, random forest, gradient boosted tree, naïve Bayes classifier, Bayesian network, hierarchical model, ensemble model, and/or another type of machine learning model that does not include artificial neural network components.

In one or more embodiments, machine learning model 208 is trained to generate predictions 206 of labels 212 assigned to images 210 in a training dataset 202. For example, training dataset 202 could include images 210 of 10 handwritten digits ranging from 0 to 9, as well as labels 212 that identify one of the 10 digits to which each of the corresponding images 210 belongs. During training of machine learning model 208, a training technique such as stochastic gradient descent and backpropagation could be used to update weights of a CNN corresponding to machine learning model 208 in a way that reduces errors between predictions 206 generated by the CNN from inputted images 210 and the corresponding labels 212.

After training of machine learning model 208 is complete, the trained machine learning model 208 can be used to generate additional predictions 206 of classes represented by labels 212 for images that are not in training dataset 202. Continuing with the above example, the trained machine learning model 208 could be applied to an input image to generate a set of 10 confidence scores for 10 classes representing 10 different handwritten digits. Each confidence score could range from 0 to 1 and represent a probability or another measure of certainty that the input image belongs to a certain class (i.e., that the input image is of a certain handwritten digit), and all confidence scores could sum to 1. When a confidence score outputted by machine learning model 208 for the input image exceeds a threshold, the input image could be determined to be from the corresponding class.

As shown in FIG. 2, processing engine 122 generates a simplified representation 204 of the trained machine learning model 208 based on predictions 206 generated by machine learning model from images 210 in training dataset 202. During the generation of simplified representation 204, processing engine 122 identifies a set of representative images 214 in training dataset 202 for each class predicted by machine learning model 208.

In one or more embodiments, representative images 214 include images 210 in training dataset 202 that are "typical" or unambiguous examples of classes or categories represented by the corresponding labels 212. For example, representative images 214 assigned to a label representing a specific handwritten digit could include images 210 in training dataset 202 that are associated with high confidence scores outputted by machine learning model 208 for that handwritten digit. Processing engine 122 could identify these representative images 214 by applying one or more thresholds to confidence scores generated machine learning model 208 for images 210 assigned to the label. The thresholds could include (but are not limited to) a minimum threshold (e.g., 0.8, 0.9, 0.95, etc.) for a confidence score associated with the handwritten digit and/or a maximum threshold (e.g., 0.1, 0.05, etc.) for confidence scores for all other handwritten digits. Processing engine 122 could also use these thresholds to identify additional sets of representative images 214 for other labels 212 in training dataset 202. As a result, processing engine 122 could generate 10 sets of representative images 214 for 10 different handwritten digits ranging from 0 to 9.

In some embodiments, representative images 214 include images that are not found in training dataset 202. Continuing with the above example, representative images 214 for a given class could include additional images for which the trained machine learning model 208 generates confidence scores that meet the minimum and/or maximum thresholds. These additional images could also, or instead, be validated by one or more humans as belonging to the class before the additional images are added to the set of representative images 214 for the class.

Processing engine 122 also generates compact representations 220(1)-220(N) of representative images 214 for different classes 222(1)-222(N) represented by labels 212 in training dataset 202. Each of compact representations 220(1)-220(N) is referred to individually as compact representation 220, and each of classes 222(1)-222(N) is referred to individually as class 222. A given compact representation 220 indicates a set of valid pixel values for a corresponding set of representative images 214. For example, a given compact representation 220 could include a statistical aggregation of pixel values in representative images 214 for a corresponding class, as described in further detail below with respect to FIG. 3. A given compact representation 220 could also, or instead, include a logical representation of pixel values in representative images 214 for a corresponding class, as described in further detail below with respect to FIG. 4.

Processing engine 122 can also generate multiple compact representations 220 of representative images 214 for each class 222. For example, processing engine 122 could divide a set of representative images 214 for a given class 222 into multiple subsets of representative images 214 for the same class 222. This division could be performed by clustering representative images 214 by visual similarity and/or other visual attributes. Processing engine 122 could then generate a separate aggregated representation and/or a logical representation of each subset of representative images 214.

Processing engine 122 populates simplified representation 204 with mappings of compact representations 220 to the corresponding classes 222. Each mapping indicates that machine learning model 208 predicts a certain class 222 for a set of images from which a corresponding compact representation 220 was generated. For example, processing engine 122 could store a mapping of each compact representation 220 to a corresponding class 222 in a lookup table, database, file, key-value store, and/or another type of data store or structure corresponding to simplified representation 204.

Inference engine 126 uses simplified representation 204 to perform inference related to machine learning model 208 for a new image 240. For example, inference engine 126 could execute within an online, offline, nearline, streaming, search-based, and/or another type of environment to generate a prediction 246 of a class to which image 240 belongs based on simplified representation 204.

More specifically, inference engine 126 performs comparisons and/or evaluations involving pixel values in image 240 and compact representations 220 of pixel values in simplified representation 204. Inference engine 126 uses the results of these comparisons and/or evaluations to generate a compact representation match 242 for image 240. Compact representation match 242 includes one or more compact representations 220 that are "closest" to the pixel values in image 240 and/or one or more compact representations 220 under which the pixel values in image 240 fall.

Inference engine 126 then generates prediction 246 based on compact representation match 242. For example, inference engine 126 could retrieve one or more classes 222 to which one or more compact representations 220 in compact representation match 242 are mapped within simplified representation 204. If compact representations 220 in compact representation match 242 are all mapped to the same class 222, inference engine 126 could generate prediction 246 of that class 222 for image 240. If compact representations 220 in compact representation match 242 are mapped to more than one class 222, inference engine 126 could generate prediction 246 to include a single class 222 to which the majority of compact representations 220 in compact representation match 242 are mapped. Inference engine 126 could also, or instead, use a set of rules, a weighted combination associated with the output classes 222 to which compact representations 220 in compact representation match 242 are mapped, a formula, and/or another technique to select a single class 222 that is "closest" or "most relevant" to image 240. When compact representations 220 in compact representation match 242 are mapped to multiple classes 222 and/or when image 240 cannot be matched to any compact representations 220 in simplified representation 204, inference engine 126 could use machine learning model 208 and/or human input to generate prediction 246 for image 240. Inference engine 126 could also, or instead, generate prediction 246 to indicate that image 240 is not a member of any output classes 222 associated with labels 212.

Processing engine 122 can also update machine learning model 208 and/or simplified representation 204 based on additional labels 212 and/or human input related to image 240 and/or prediction 246. For example, processing engine 122 and/or inference engine 126 could receive input from one or more users confirming the accuracy of prediction 246 and/or specifying a different class for image 240. Processing engine 122 could add image 240 and the corresponding class to a record in training dataset 202 and retrain machine learning model 208 using the record. Processing engine 122 could also, or instead, update compact representations 220 and/or classes 222 to which compact representations 220 are mapped based on predictions 206 outputted by the retrained machine learning model 208 and/or images 210 and labels 212 that have been added to training dataset 202. Consequently, the accuracy of machine learning model 208 and/or simplified representation 204 improve as predictions of classes 222 for images (e.g., image 240) are generated using simplified representation 204 and validated.

Figure 3:
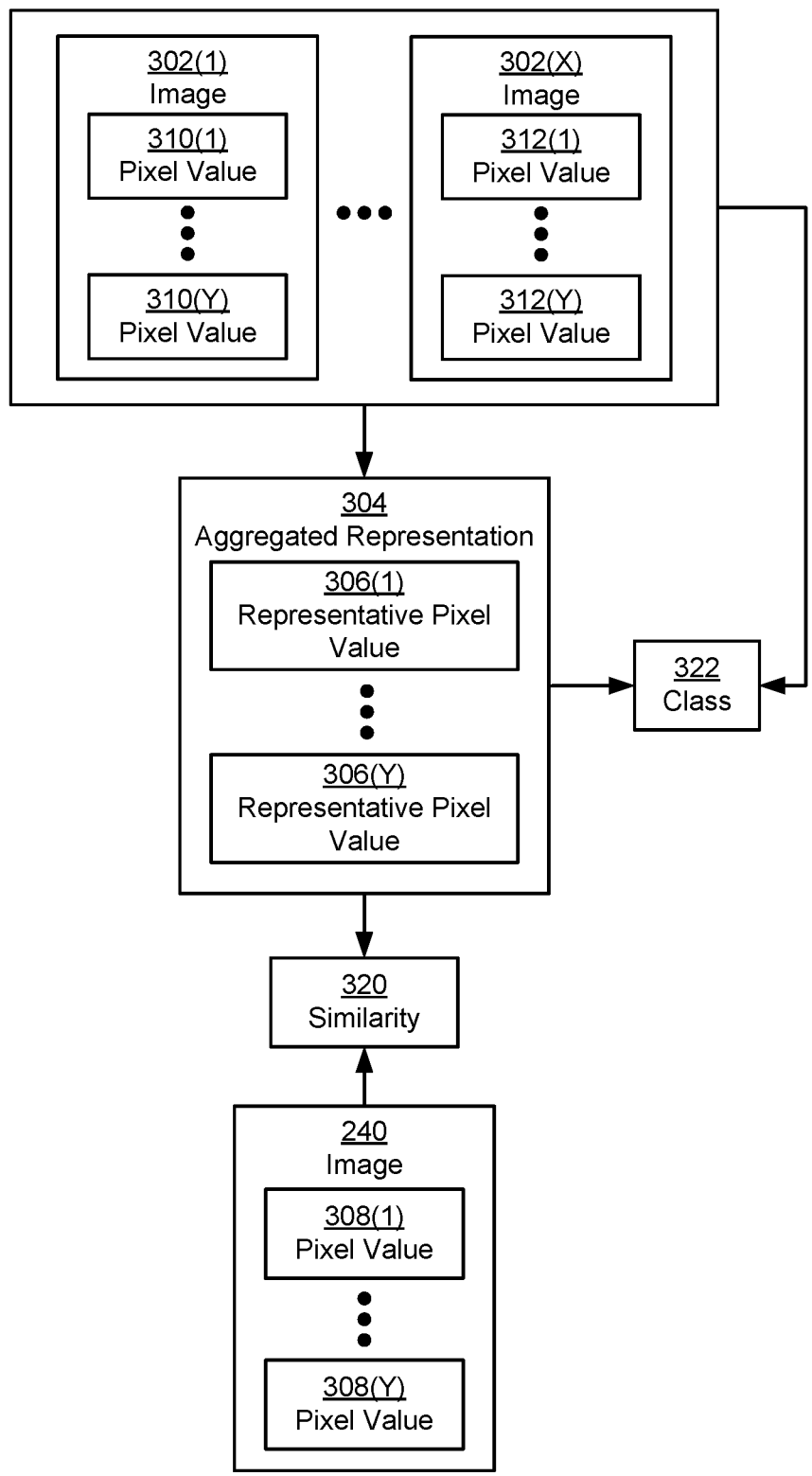
FIG. 3 illustrates the use of an aggregated representation of a set of images to predict a class associated with an input image, according to various embodiments.

FIG. 3 illustrates the use of an aggregated representation 304 of a set of images 302(1)-302(X) to predict a class 322 associated with an input image 240, according to various embodiments. Each of images 302(1)-302(X) is referred to individually as image 302. Image 302(1) includes a set of pixel values 310(1)-310(Y), each of which is referred to individually as pixel value 310. Image 302(X) includes a different set of pixel values 312(1)-312(Y), each of which is referred to individually as pixel value 312. Pixel values 310-312 include RGB values, intensity values, HSV values, and/or other representations of color, brightness, and/or other types of visual attributes for various pixel locations in images 302.

In some embodiments, images 302 include the same number of pixel values 310 and 312 (i.e., Y pixel values, where Y is an integer greater than or equal to 0). For example, images 302 could have the same image size (e.g., height and width). If images 302 differ in image size, one or more images 302 could be cropped, scaled, or otherwise resized to have the same size as other images 302. One or more images 302 could also, or instead, be recentered, rotated, and/or otherwise transformed to standardize the locations, positions, and/or orientations of objects (e.g., handwritten digits, faces, etc.) within images 302. This standardization of image sizes and objects across images 302 allows pixel values 310-312 representing the same pixel locations to be compared or processed across images 302. For example, pixel values 310 or 312 in each image 302 could be stored in an array or matrix, with each element in the array or matrix corresponding to a pixel location in the image. Because pixel values 310-312 from the same array or matrix element in images 302 are from the same pixel locations in images 302, pixel values 310-312 from the same array or matrix indexes can be directly compared or processed across images 302 to characterize similarities or differences in images 302.

In one or more embodiments, images 302 are included in a set of representative images 214 for a given label in training dataset 202. For example, images 302 could be associated with predictions 206 of the same class 322 by machine learning model 208. These predictions 206 could additionally be associated with high confidence scores outputted by machine learning model 208 for class 322, labels 212 of class 322 for images 302, human validation of class 322 for images 302, and/or other indicators of high likelihood that images 302 belong to class 322.

As mentioned above, processing engine 122 generates compact representations 220 of a set of representative images 214 and uses compact representations 220 to produce simplified representation 204 of machine learning model 208. In some embodiments, these compact representations 220 include aggregated representation 304 of a set of images 302 from the same class 322. For example, processing engine 122 could generate a single aggregated representation 304 from multiple images 302 for which machine learning model 208 generates high confidence scores for a given class 322.

To generate aggregated representation 304, processing engine 122 combines pixel values 310-312 from the same pixel locations in images 302 into representative pixel values 306(1)-306(Y) (each of which is referred to individually as representative pixel value 306) for these pixel locations. For example, processing engine 122 could compute each representative pixel value 306 as a mean, median, set of percentiles, standard deviation, mode, minimum, maximum, histogram, and/or another set of summary statistics for multiple pixel values 310-312 at the same pixel location within images 302. Representative pixel values 306 in aggregated representation 304 could thus characterize the ranges or distributions of pixel values 310-312 in the corresponding pixel locations within images 302.

As described above, processing engine 122 populates simplified representation 204 with a mapping of aggregated representation 304 to class 322 to which images 302 belong. Within simplified representation 204, the mapping indicates that machine learning model 208 generates a prediction of class 322 for images that can be matched to aggregated representation 304. Consequently, the mapping serves as a proxy for the operation of machine learning model 208 in predicting class 322 for certain images.

Inference engine 126 uses the mapping of aggregated representation 304 to class 322 in simplified representation 204 to generate a prediction of class 322 for a new image 240 that is not in training dataset 202. More specifically, inference engine 126 computes a similarity 320 between image 240 and aggregated representation 304. For example, inference engine 126 could compute similarity 320 as a cosine similarity, Euclidean distance, edit distance, dot product, and/or another measure of vector similarity or distance between pixel values 308(1)-308(Y) (each of which is referred to individually as pixel value 308) in image 240 and the corresponding representative pixel values 306(1)-306(Y) in aggregated representation 304. In another example, inference engine 126 could use a function to convert pixel values 308 in image 240 into a first embedding, hash value, or other lower-dimensional representation and use the same function to convert representative pixel values 306 in aggregated representation 304 into a second lower-dimensional representation. Inference engine 126 could then compute similarity 320 as a cosine similarity, Euclidean distance, edit distance, dot product, and/or another measure of vector similarity or distance between the two lower-dimensional representations. In a third example, inference engine 126 could use a distribution of pixel values denoted by one or more summary statistics in each representative pixel value 306 in aggregated representation 304 to estimate a z-score representing the number of standard deviations between the mean pixel value in the distribution and a corresponding pixel value 308 in image 240. Inference engine 126 could then calculate similarity 320 as an average and/or another aggregation of z-scores for all pixel values 308 in image 240.

Inference engine 126 compares similarity 320 to other measures of similarity (not shown) between image 240 and other aggregated representations (not shown) in simplified representation 204. For example, inference engine 126 could calculate and/or aggregate one or more vector similarities and/or z-scores between image 240 and each aggregated representation in simplified representation 204. Inference engine 126 could also compare the vector similarities and/or z-scores across the aggregated representations in simplified representation 204. When similarity 320 between image 240 and aggregated representation 304 is greater than the other measures of similarity between image 240 and other aggregated representations in simplified representation 204 (e.g., when the distance between pixel values 308 in image 240 and representative pixel values 306 in aggregated representation 304 is lower than the distances between pixel values 308 and other representative pixel values in the other aggregated representations) and/or exceeds a threshold for minimum similarity with aggregated representations in simplified representation 204, inference engine 126 determines that image 240 belongs to class 322 to which aggregated representation 304 is mapped. If no measures of similarity between image 240 and aggregated representations in simplified representation 204 meet the threshold for minimum similarity, inference engine 126 can compare image 240 to logical representations of representative images 214 in simplified representation 204 to predict a class for image 240, as described in further detail below with respect to FIG. 4. Inference engine 126 can also, or instead, use machine learning model 208 to predict a class for image 240.

Figure 4:
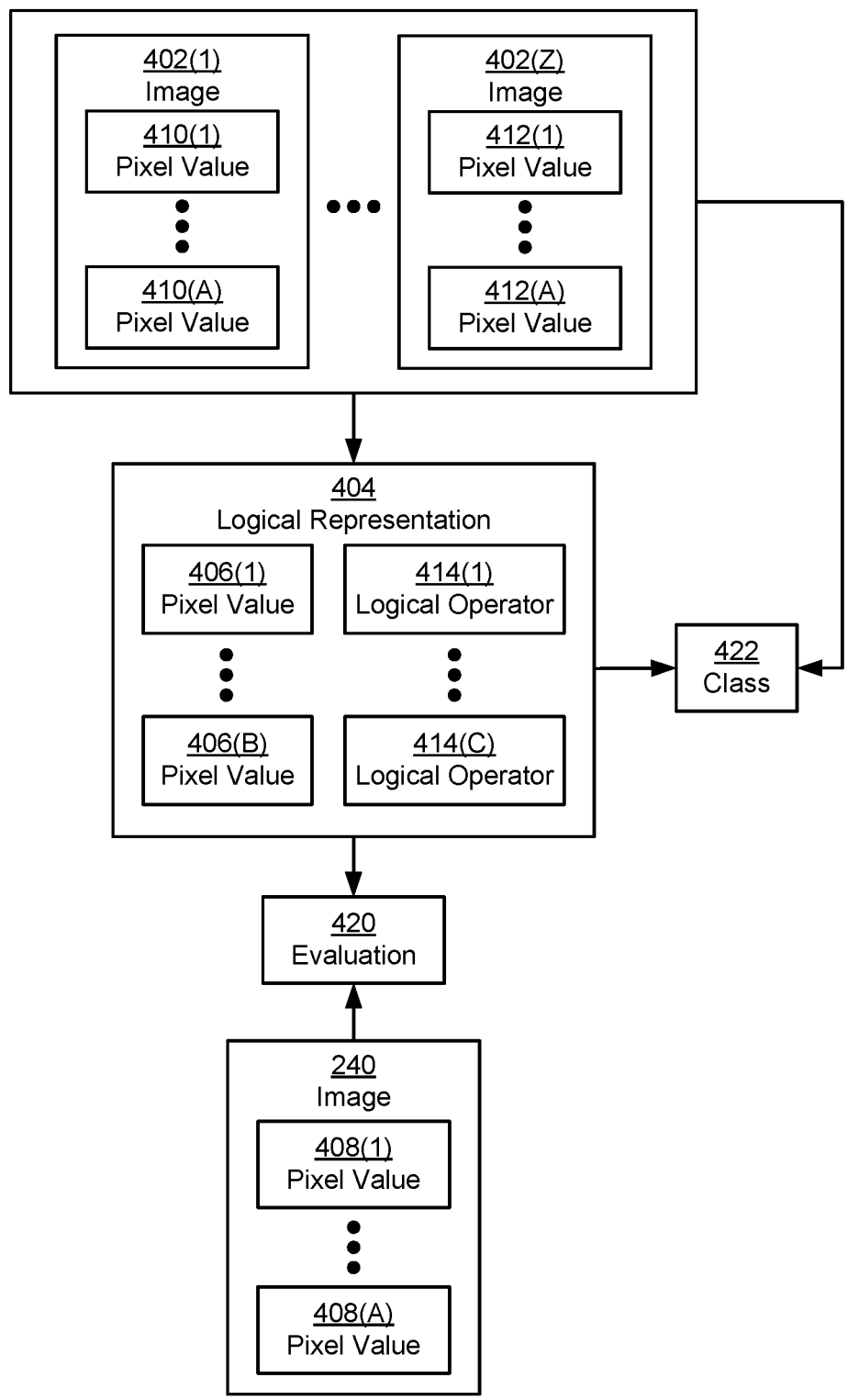
FIG. 4 illustrates the use of a logical representation of a set of images to predict a class associated with an input image, according to various embodiments.

FIG. 4 illustrates the use of a logical representation 404 of a set of images 402(1)-402(Z) to predict a class 422 associated with an input image, according to various embodiments. Each of images 402(1)-402(Z) is referred to individually as image 402. Image 402(1) includes a set of pixel values 410(1)-410(A), each of which is referred to individually as pixel value 410. Image 402(Z) includes a different set of pixel values 412(1)-412(A), each of which is referred individually to as pixel value 412. As with pixel values 310-312 of FIG. 3, pixel values 410-412 include RGB values, intensity values, HSV values, and/or other representations of color, brightness, and/or other types of visual attributes for various pixel locations in images 402.

In one or more embodiments, images 402 of FIG. 4 include the same number of pixel values 410 and 412 (i.e., A pixel values, where A is an integer greater than or equal to 0). For example, images 402 could have the same image size (e.g., height and width). If images 402 differ in image size, one or more images 402 could be cropped, scaled, or otherwise resized to have the same size as other images 402. One or more images 402 could also, or instead, be recentered, rotated, and/or otherwise transformed to standardize the locations, positions, and/or orientations of objects (e.g., handwritten digits, faces, etc.) within images 402. This standardization of image sizes and objects across images 402 allows pixel values 410-412 representing the same pixel locations to be compared or processed across images 402. For example, pixel values 410 or 412 in each image 402 could be stored in an array or matrix, with each element in the array or matrix corresponding to a pixel location in the image. Because pixel values 410-412 from the same array or matrix element in images 402 are from the same pixel locations in images 402, pixel values 410-412 from the same array or matrix indexes can be directly compared or processed across images 402 to characterize similarities or differences in images 402.

As with images 302 of FIG. 3, images 402 can be included in a set of representative images 214 for a given label in training dataset 202. For example, images 402 could be associated with predictions 206 of the same class 322 by machine learning model 208. These predictions 206 could additionally be associated with high confidence scores outputted by machine learning model 208 for class 422, labels 212 of class 422 for images 402, human validation of class 422 for images 402, and/or other indicators of high likelihood that images 402 belong to class 422.

As mentioned above, compact representations 220 of a set of representative images 214 can include logical representation 404 of images 402 from the same class 422. For example, processing engine 122 could generate a single logical representation 404 from multiple representative images 402 for a given class 422.

As shown in FIG. 4, logical representation 404 includes representations of a set of pixel values 406(1)-406(B) (where B is an integer greater than or equal to 0), each of which is referred to individually as pixel value 406. Pixel values 406 can include one or more pixel values for each image 402 and each of A pixel locations in images 402. For example, pixel values 406 could include a numeric pixel value ranging from 0 to 256 for a given pixel location and a red, green, blue, brightness, and/or another channel in each image 402. In another example, pixel values 406 could include a binary pixel value of 0 or 1 for each pixel location in images 402. Pixel values 406 can also, or instead, reflect pixel value ranges, minimum or maximum pixel value thresholds, and/or other representations of "valid" pixel values 406 for each pixel location in images 402. For example, logical representation 404 could include an upper and/or lower limit on pixel values 406 within a given image 402. In another example, logical representation 404 could include a complex expression that returns true or false, given a pixel value for a certain pixel location.

Logical representation 404 also includes a set of logical operators 414(1)-414(C), each of which is referred to individually as logical operator 414. Each logical operator 414 is applied to one or more pixel values 406 to characterize the set of valid pixel values 410-412 in images 402.

In some embodiments, processing engine 122 initially represents pixel values 410-412 in images 402 as a disjunctive normal form (DNF) that includes an "OR of ANDs" within logical representation 404. Within logical representation 404, each set of pixel values 410 or 412 within a particular image 402 is represented as a set of pixel values 406 connected by logical operators 414 corresponding to logical conjunctions (i.e., ANDs). Multiple images 402 are represented within logical representation 404 by connecting the corresponding sets of pixel values 406 by additional logical operators 414 corresponding to logical disjunctions (i.e., ORs). An example logical representation 404 for images 402 that are three pixels high by three pixels wide includes the following:

{P(0,0)=0 AND P(0,1)=1 AND P(0,2)=0 AND P(1,0)=0 AND P(1,1)=1 AND P(1,2)=0 AND P(2,0)=0 AND P(2,1)=1 AND P(2,2)=0} OR
{P(0,0)=1 AND P(0,1)=0 AND P(0,2)=0 AND P(1,0)=1 AND P(1,1)=0 AND P(1,2)=0 AND P(2,0)=1 AND P(2,1)=0 AND P(2,2)=0} OR

In the example logical representation 404 above, each pixel is denoted by P(row, col), where "row" is an index into the row in which the pixel is located and "col" is an index into the column in which the pixel is located. Each pixel is also assigned a binary pixel value of 0 or 1. This binary pixel value can be determined by assigning a threshold (e.g., 128, 250, etc.) to original pixel values 410-412 (e.g., eight-bit pixel values 410-412 ranging from 0 to 256) in images 402. A single image 402 is represented by a set of nine logical expressions that specify valid pixel values for nine different pixel locations within the image. These nine logical expressions are connected by a set of eight AND operators. Multiple images 402 are represented by OR operators between sets of nine logical representations denoting valid pixel values from different images 402. The number of OR operators is one less than the number of images 402.

In one or more embodiments, processing engine 122 compresses the initial DNF in logical representation 404 to reduce the complexity and/or overhead associated with storing or evaluating logical representation 404. For example, processing engine 122 could use a set of Boolean algebra rules, a Karnaugh map, a truth graph, a logic optimization technique, a truth table reduction technique, and/or another Boolean expression reduction technique to convert pixel values 406 and/or logical operators 414 in logical representation 404 into a simpler form.

Continuing with the above example of 3×3 binary pixel images, processing engine 122 can generate the following initial logical representation 404 for images 402 that belong to a class representing vertical lines:

{P(0,0)=1 AND P(0,1)=0 AND P(0,2)=0 AND P(1,0)=1 AND P(1,1)=0 AND P(1,2)=0 AND P(2,0)=1 AND P(2,1)=0 AND P(2,2)=0} OR
{P(0,0)=1 AND P(0,1)=0 AND P(0,2)=0 AND P(1,0)=1 AND P(1,1)=0 AND P(1,2)=0 AND P(2,0)=0 AND P(2,1)=1 AND P(2,2)=0} OR
{P(0,0)=0 AND P(0,1)=1 AND P(0,2)=0 AND P(1,0)=1 AND P(1,1)=0 AND P(1,2)=0 AND P(2,0)=0 AND P(2,1)=1 AND P(2,2)=0} OR
{P(0,0)=0 AND P(0,1)=1 AND P(0,2)=0 AND P(1,0)=0 AND P(1,1)=1 AND P(1,2)=0 AND P(2,0)=0 AND P(2,1)=1 AND P(2,2)=0} OR
{P(0,0)=1 AND P(0,1)=0 AND P(0,2)=0 AND P(1,0)=0 AND P(1,1)=1 AND P(1,2)=0 AND P(2,0)=0 AND P(2,1)=1 AND P(2,2)=0} OR
{P(0,0)=0 AND P(0,1)=0 AND P(0,2)=1 AND P(1,0)=0 AND P(1,1)=1 AND P(1,2)=0 AND P(2,0)=0 AND P(2,1)=1 AND P(2,2)=0} OR
{P(0,0)=0 AND P(0,1)=1 AND P(0,2)=0 AND P(1,0)=0 AND P(1,1)=1 AND P(1,2)=0 AND P(2,0)=1 AND P(2,1)=0 AND P(2,2)=0} OR
{P(0,0)=0 AND P(0,1)=1 AND P(0,2)=0 AND P(1,0)=0 AND P(1,1)=1 AND P(1,2)=0 AND P(2,0)=0 AND P(2,1)=0 AND P(2,2)=1} OR
{P(0,0)=0 AND P(0,1)=0 AND P(0,2)=1 AND P(1,0)=0 AND P(1,1)=0 AND P(1,2)=1 AND P(2,0)=0 AND P(2,1)=0 AND P(2,2)=1} OR
{P(0,0)=0 AND P(0,1)=1 AND P(0,2)=0 AND P(1,0)=0 AND P(1,1)=0 AND P(1,2)=1 AND P(2,0)=0 AND P(2,1)=0 AND P(2,2)=1} OR
{P(0,0)=0 AND P(0,1)=0 AND P(0,2)=1 AND P(1,0)=0 AND P(1,1)=0 AND P(1,2)=1 AND P(2,0)=0 AND P(2,1)=1 AND P(2,2)=0}

The example logical representation 404 above includes 11 sets of nine logical expressions, where each logical expression specifies a valid pixel value 406 for a corresponding pixel location within an image. The nine logical expressions within each set are connected by logical conjunctions, and different sets of nine logical expressions are connected by logical disjunctions. Each set of nine logical expressions represents a different image of a vertical line. The first three sets of nine logical expressions represent three images 402 in which a vertical line is located substantially on the left side of each image 402. The next five sets of nine logical expressions represent five images 402 in which a vertical line is located substantially in the middle of each image 402. The last three sets of nine logical expressions represent three images 402 in which a vertical line is located substantially on the right side of each image 402. As a result, the example logical representation 404 represents all possible combinations of pixel values 406 that correspond to images 402 of vertical lines.

Processing engine 122 can reduce the example logical representation 404 into the following:

{P(1,0)=1 AND {{P(0,0)=1 AND {P(2,0)=1 XOR P(2,1)=1}} XOR {P(2,0)=1 AND {P(0,0)=1 XOR P(0,1)=1}} AND P(0,2)=0 AND P(1,1)=0 AND P(1,2)=0 AND P(2,2)=0} OR

{P(1,1)=1 AND {{P(0,1)=1 AND {P(2,1)=1 XOR P(2,0)=1 XOR P(2,2)=1}} XOR {P(2,1)=1 AND {P(0,0)=1 XOR P(0, 1)=1 XOR P(0,2)=1}} AND P(1,0)=0 AND P(1,2)=0} OR (P(1,2)=1 AND {{P(0,2)=1 AND {P(2,1)=1 XOR P(2,2)=1}} XOR {P(2,2)=1 AND {P(0,1)=1 XOR P(0,2)=1}} AND P(0,0)=0 AND P(1,0)=0 AND P(2,0)=0 AND P(1,1)=0}

The example simplified logical representation 404 above includes three logical expressions in brackets that are separated by logical disjunctions. The first logical expression represents the three images 402 in which a vertical line is located substantially on the left side of the image. The second expression represents the five images 402 in which a vertical line is located substantially in the center of the image. The third expression represents the three images 402 in which a vertical line is located substantially on the right side of the image.

After logical representation 404 is created and simplified, processing engine 122 stores a mapping of logical representation 404 to the corresponding class 422 in simplified representation 204. For example, processing engine 122 could store a mapping of the simplified logical representation 404 of images 402 of vertical lines above to a given class 422 representing images 402 of vertical lines within a key-value store, database, file, and/or another data structure or data store corresponding to simplified representation 204.

Inference engine 126 uses the mapping of logical representation 404 to class 422 in simplified representation 204 to generate a prediction of class 422 for a new image 240 that is not in training dataset 202. More specifically, inference engine 126 performs an evaluation 420 of logical representation 404 using pixel values 408(1)-408(A) (each of which is referred to individually as pixel value 408) in image 240. For example, inference engine 126 could evaluate logical expressions in logical representation 404 using pixel values 408 in image 240. When a given pixel value 408 for a pixel location corresponds to a valid pixel value 406 for the same pixel location in logical representation 404, inference engine 126 could determine that the logical expression representing the valid pixel value 406 in logical representation 404 evaluates to true. Conversely, when a given pixel value 408 does not correspond to a valid pixel value 406 for the same pixel location in logical representation 404, inference engine 126 could determine that the logical expression evaluates to false. Inference engine 126 could then use logical operators 414 in logical representation 404 to combine true and/or false values resulting from evaluation of logical expressions for valid pixel values 406 to determine an overall value of true or false for the entire logical representation 404.

When logical representation 404 evaluates to true given pixel values 408 in image 240, inference engine 126 determines that image 240 belongs to class 422 to which logical representation 404 is mapped. When a different logical representation (not shown) mapped to another class (not shown) evaluates to true given pixel values 408 in image 240, inference engine 126 determines that image 240 belongs to the other class. If no logical representations 404 within simplified representation 204 evaluate to true given pixel values 408 in image 240, inference engine 126 can compare image 240 to aggregated representations of representative images 214 in simplified representation 204 to predict a class for image 240, as discussed above with respect to FIG. 4. Inference engine 126 can also, or instead, use machine learning model 208 to predict a class for image 240 and/or indicate that image 240 does not belong to any class associated with an aggregated representation and/or a logical representation.

Figure 5:
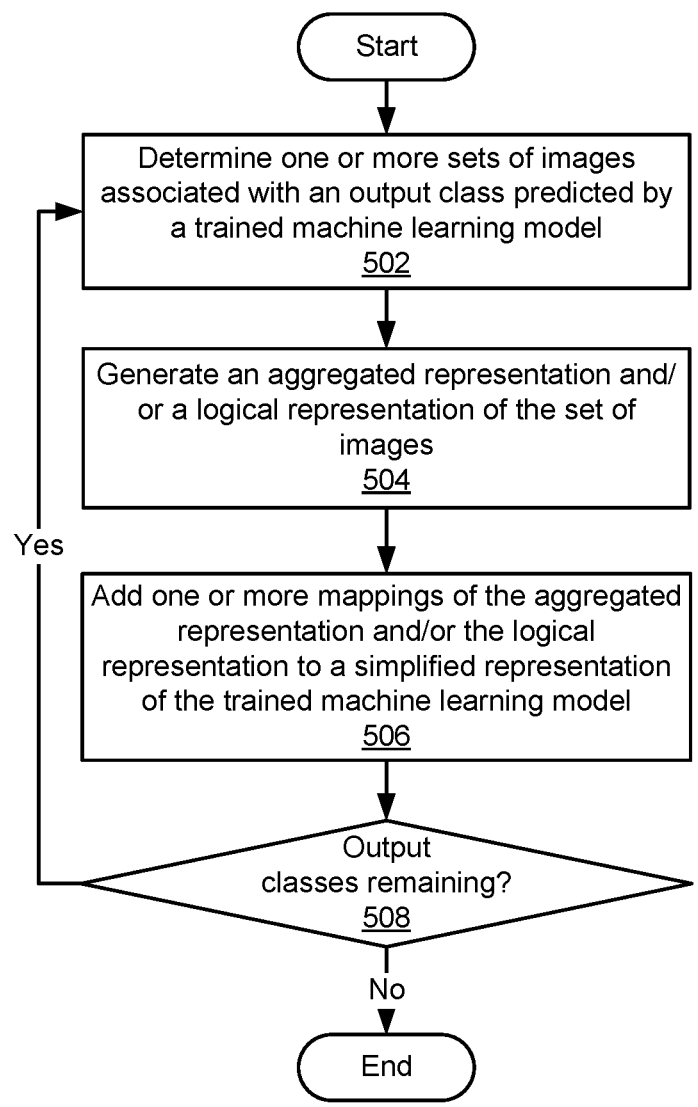
FIG. 5 sets forth a flow diagram of method steps for simplifying a machine learning model, according to various embodiments.

FIG. 5 sets forth a flow diagram of method steps for simplifying a machine learning model, according to various embodiments. Although the method steps are described in conjunction with the systems of FIGS. 1-2, persons skilled in the art will understand that any system configured to perform the method steps in any order falls within the scope of the present disclosure.

As shown, processing engine 122 determines 502 one or more sets of images associated with an output class predicted by a trained machine learning model. For example, the trained machine learning model could include a CNN that predicts classes representing handwritten digits, animals, landmarks, faces, machines, and/or other types of objects in images. Processing engine 122 could identify an initial set of images that are labeled with the output class in a training dataset and/or that are associated with predictions of the output class by the CNN. For each of these images, processing engine 122 could filter the initial set of images by a minimum threshold for a first confidence score outputted by the trained machine learning model for the output class and/or a maximum threshold for other confidence scores outputted by the trained machine learning model for other output classes. If an image meets all the thresholds and/or other criteria indicating a high likelihood that the image belongs to a certain output class, processing engine 122 could include the image in a set of "typical" images for the output class. After a set of "typical" images is populated with images that meet the threshold(s) and/or criteria for the output class, processing engine 122 could optionally cluster the images in the set by visual similarity and/or other criteria to divide the images into multiple sets of visually similar and/or visually related images.

Next, processing engine 122 generates 504 an aggregated representation and/or a logical representation of each set of images. For example, processing engine 122 could aggregate pixel values for the same pixel location in each set of images into a representative pixel value for that pixel location. The representative pixel value could include a mean, median, mode, minimum, maximum, percentile, standard deviation, histogram, and/or another set of summary statistics related to the distribution of pixel values in the set of images for the pixel location. Processing engine 122 could store the representative pixel values for a set of pixel locations shared by the set of images in an aggregated representation of the set of images. In another example, processing engine 122 could generate a logical representation of pixel values across the set of images. The logical representation could include conjunctions between pixel values in the same image and disjunctions between sets of pixels from different images. In other words, the logical representation would represent all combinations of pixel values that are present in the set of images. After the logical representation is generated, processing engine 122 could use a Boolean expression reduction technique to simplify the logical representation.

Processing engine 122 then adds 506 one or more mappings of the aggregated representation and/or the logical representation to the output class to a simplified representation of the trained machine learning model. For example, processing engine 122 could store a mapping of each aggregated representation and/or logical representation to the output class within a lookup table, database, and/or another data structure or data store corresponding to the simplified representation.

Processing engine 122 also determines 508 whether or not any output classes remain. For example, processing engine 122 could determine that output classes are remaining if mappings for these output classes have not been added to the simplified representation of the trained machine learning model. For each remaining output class, processing engine 122 repeats operations 502-506 to determine one or more sets of "typical" images for that output class, generate aggregated and/or logical representations of each set of images, and add mappings between the aggregated and/or logical representations to the output class to the simplified representation of the trained machine learning model. Processing engine 122 finishes creating the simplified representation after mappings between aggregated and/or logical representations of images to all output classes have been added to the simplified representation.

Figure 6:
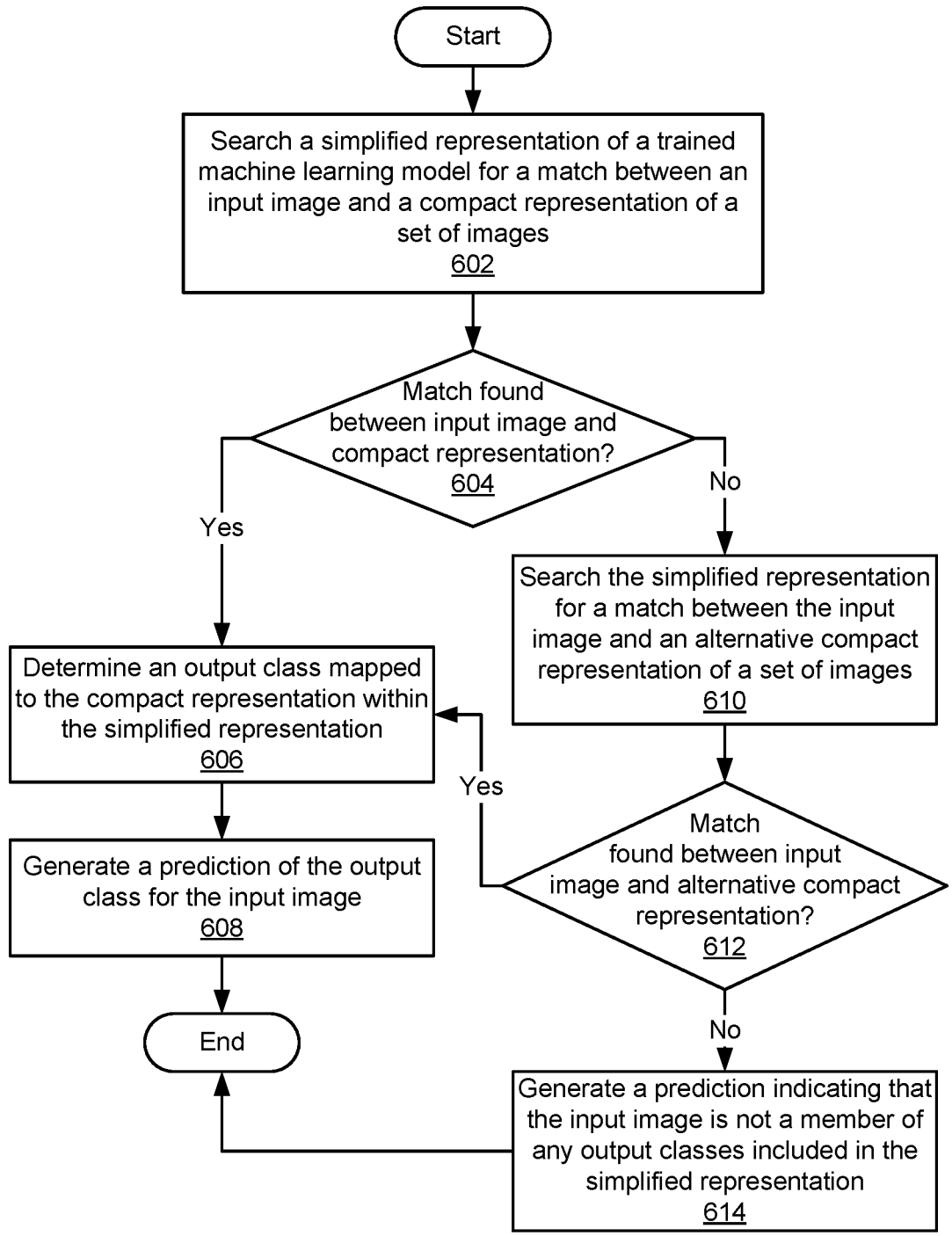
FIG. 6 sets forth a flow diagram of method steps for predicting a class associated with an image, according to various embodiments.

FIG. 6 sets forth a flow diagram of method steps for predicting a class associated with an image, according to various embodiments. Although the method steps are described in conjunction with the systems of FIGS. 1-2, persons skilled in the art will understand that any system configured to perform the method steps in any order falls within the scope of the present disclosure.

As shown, inference engine 126 searches 602 a simplified representation of a trained machine learning model for a match between an input image and a compact representation of a set of images. In some embodiments, the compact representation includes an aggregated representation of a set of images. Inference engine 126 can thus perform operation 602 by attempting to match the input image to the aggregated representation based on measures of similarities between the image and multiple aggregated representations mapped to different output classes in the simplified representation.

Next, inference engine 126 determines 604 whether or not a match is found between the input image and a compact representation. For example, if the highest similarity between the input image and an aggregated representation in the simplified representation of the machine learning model exceeds a threshold for minimum similarity, inference engine could determine that the input image matches the aggregated representation. Conversely, inference engine 126 could determine that no match is found if the highest similarity between the input image and an aggregated representation in the simplified representation of the machine learning model does not meet the threshold and/or the image "matches" to multiple aggregated representations that are mapped to different output classes within the simplified representation of the machine learning model.

When inference engine 126 finds a match between the input image and a compact representation, inference engine 126 determines 606 an output class mapped to the compact representation within the simplified representation of the machine learning model. For example, inference engine 126 could retrieve the output class from a record in which the compact representation is stored and/or via a link from the compact representation within the simplified representation of the machine learning model. Inference engine 126 also generates 608 a prediction of the output class for the image. For example, inference engine 126 could store a mapping between the image and the output class, generate output indicating that the class belongs to the output class, and/or otherwise associate the input image with the output class.

When inference engine 126 cannot find a match between the input image and a compact representation, inference engine 126 searches 610 the simplified representation for a match between the input image and an alternative compact representation of a set of images. In some embodiments, the alternative compact representation corresponds to a logical representation of a set of images associated with a given output class. Inference engine 126 can thus perform operation 610 by evaluating each logical representation in the simplified representation using a set of pixel values in the input image.

Inference engine 126 determines 604 whether or not a match is found between the input image and an alternative compact representation. For example, if a logical representation evaluates to true given the pixel values in the input image, inference engine 126 could determine that the input image matches the logical representation. When no logical representations evaluate to true given the pixel values in the input image, inference engine 126 could determine that the input image does not match any alternative compact representations included in the simplified representation of the machine learning model.

When inference engine 126 finds a match between the input image and an alternative compact representation, inference engine 126 determines 606 an output class mapped to the alternative compact representation within the simplified representation of the machine learning model. For example, inference engine 126 could retrieve the output class from a record in which the alternative compact representation is stored and/or via a link from the alternative compact representation within the simplified representation of the machine learning model. Inference engine 126 also generates 608 a prediction of the output class for the image. For example, inference engine 126 could store a mapping between the image and the output class, generate output indicating that the class belongs to the output class, and/or otherwise associate the input image with the output class.

When inference engine 126 is unable to find a match between the input image and any type of compact representation (e.g., aggregated representation, logical representation, etc.) included in the simplified representation of the machine learning model, inference engine 126 generates 614 a prediction indicating that the input image is not a member of any output classes included in the simplified representation. For example, inference engine 126 could output a prediction that the input image falls into an "unknown" or "other" class that is not associated with a label predicted by the machine learning model.

Inference engine 126 can also, or instead, execute the trained machine learning model to generate a prediction of an output class for the input image. For example, inference engine 126 could apply a trained CNN for which the simplified representation was generated to the input image to generate a set of confidence scores for a set of output classes. Inference engine 126 could also apply one or more thresholds to the confidence scores. If the highest confidence score meets a minimum threshold and/or other confidence scores meet a maximum threshold, inference engine could determine that the CNN has predicted the output class associated with the highest confidence score for the input image.

In sum, the disclosed techniques generate simplified representations of CNNs and/or other trained machine learning models that predict classes to which images belong. A set of images that is "typical" of a given output class predicted by a machine learning model is determined by applying thresholds to confidence scores generated by the machine learning model from a set of images. An image is added to the set of "typical" images if a first confidence score outputted by the trained machine learning model for the output class meets a minimum threshold and/or other confidence scores outputted by the trained machine learning model for other output classes meet a maximum threshold.

A compact representation of the set of "typical" images is generated from pixel values in the images. The compact representation can include an aggregated representation of the pixel values. The aggregated representation includes one or more summary statistics for a distribution of pixel values for each pixel location within the set of images. The compact representation can also, or instead, include a logical representation of pixel values in the images. The logical representation includes conjunctions between pixel values in the same image and disjunctions between sets of pixel values in different images. The logical representation can also be simplified using a Boolean expression reduction technique. After the compact representation is generated, the compact representation is mapped to the output class within a simplified representation of the machine learning model. The process can be repeated for other output classes predicted by the machine learning model. As a result, the simplified representation of the machine learning model is populated with multiple mappings of compact representations of images to the corresponding output classes.

The simplified representation of the machine learning model can then be used to generate predictions of output classes for additional images. In particular, pixel values in the input image are used to match the input image to a compact representation in the simplified representation of the machine learning model. For example, measures of similarity between the input image and aggregated representations of images in the simplified representation could be computed, and the input image could be matched to the aggregated representation with the highest similarity to the pixel values in the input image. When the input image does not match any of the aggregated representations (e.g., when the highest similarity between the input image and an aggregated representation does not meet a minimum threshold), logical representations of images in the simplified representation of the machine learning model could be evaluated using the pixel values in the input image. When a logical representation evaluates to true, the input image could be matched to the logical representation.

After the input image is matched to a compact representation, the output class to which the compact representation is mapped is retrieved, and a prediction of the output class for the input image is generated. If the input image does not match any aggregated representations or logical representations, a prediction of an "unknown" or "other" class can be generated for the image.

One technical advantage of the disclosed techniques relative to the prior art is that, with the disclosed techniques, a simplified representation of a trained machine learning model is generated that includes a mapping between a compact representation of a set of images and an output class. During operation, the mapping is used instead of the trained machine learning model to predict the output class for certain types of input images. With this approach, the size and complexity of the simplified representation of the trained machine learning model is independent of the size and complexity of the actual trained machine learning model, which allows the trained machine learning model to be compressed beyond the point at which conventional compression techniques cause the accuracy of the compressed model to be adversely impacted. Another technical advantage of the disclosed techniques is the ability to perform machine learning inference operations via efficient "lookup" operations using the mapping based on pixel values in an input image. Consequently, machine learning inference operations performed based on the disclosed techniques can be faster and incur less resource overhead relative to conventional approaches that require inference operations to be performed by compressed machine learning models that are proportional in size and complexity to their corresponding uncompressed machine learning models. These technical advantages provide one or more technological improvements over prior art approaches.

1. In some embodiments, a computer-implemented method for simplifying a trained machine learning model comprises determining a first set of images associated with a first output class predicted by the trained machine learning model; generating a first aggregated representation of the first set of images, wherein the first aggregated representation comprises a first plurality of representative pixel values for a plurality of pixel locations included in the first set of images; and generating a simplified representation of the trained machine learning model that includes a first mapping of the first aggregated representation to the first output class, wherein the first mapping indicates that the trained machine learning model predicts the first output class for one or more input images.

2. The computer-implemented method of clause 1, further comprising storing, within the simplified representation of the trained machine learning model, a second mapping of a second aggregated representation of a second set of images to a second output class predicted by the trained machine learning model.

3. The computer-implemented method of any of clauses 1-2, further comprising matching an input image to the first mapping based on a plurality of pixel values included in the input image and the first plurality of representative pixel values in the first aggregated representation; and generating a prediction of the first output class for the input image based on the first mapping.

4. The computer-implemented method of any of clauses 1-3, wherein matching the input image to the first mapping comprises determining that a first similarity between the plurality of pixel values and the first plurality of representative pixel values is higher than a second similarity between the plurality of pixel values and a second plurality of representative pixel values associated with a second output class predicted by the trained machine learning model.

5. The computer-implemented method of any of clauses 1-4, wherein matching the input image to the first mapping comprises computing a vector similarity based on the plurality of pixel values included in the input image and the first plurality of representative pixel values included in the first aggregated representation.

6. The computer-implemented method of any of clauses 1-5, wherein matching the input image to the first mapping comprises computing a deviation of each pixel value included in the plurality of pixel values from a corresponding representative pixel value included in the first plurality of representative pixel values.

7. The computer-implemented method of any of clauses 1-6, wherein generating the first aggregated representation of the first set of images comprises populating a representative pixel value for each pixel location included in the plurality of pixel locations with one or more summary statistics associated with a set of pixel values for the pixel location from the first set of images.

8. The computer-implemented method of any of clauses 1-7, wherein determining the first set of images comprises filtering a second set of images included in a training dataset used to generate the trained machine learning model based on one or more thresholds for a set of confidence scores generated by the trained machine learning model from the second set of images.

9. The computer-implemented method of any of clauses 1-8, wherein the one or more thresholds comprise a minimum threshold for a first confidence score associated with the first output class and a maximum threshold for a second confidence score associated with a second output class.

10. The computer-implemented method of any of clauses 1-9, wherein the trained machine learning model comprises a trained convolutional neural network.

11. In some embodiments, one or more non-transitory computer-readable media store instructions that, when executed by one or more processors, cause the one or more processors to perform the steps of determining a first set of images associated with a first output class predicted by a trained machine learning model; generating a first aggregated representation of the first set of images, wherein the first aggregated representation comprises a first plurality of representative pixel values for a plurality of pixel locations included in the first set of images; and generating a simplified representation of the trained machine learning model that includes a first mapping of the first aggregated representation to the first output class, wherein the first mapping indicates that the trained machine learning model predicts the first output class for one or more input images.

12. The one or more non-transitory computer-readable media of clause 11, wherein the instructions further cause the one or more processors to perform the step of storing, within the simplified representation of the trained machine learning model, a second mapping of a logical representation of a second set of images to a second output class predicted by the trained machine learning model, wherein the logical representation comprises one or more conjunctions of a first set of pixel values included in a first image and a disjunction of the first set of pixel values and a second set of pixel values included in a second image.

13. The one or more non-transitory computer-readable media of any of clauses 11-12, wherein the instructions further cause the one or more processors to perform the steps of matching a first input image to the first mapping based on a plurality of pixel values included in the first input image and the first plurality of representative pixel values included in the first aggregated representation; and generating a first prediction of the first output class for the first input image based on the first mapping.

14. The one or more non-transitory computer-readable media of any of clauses 11-13, wherein matching the first input image to the first mapping comprises determining that a first similarity between the plurality of pixel values and the first plurality of representative pixel values is higher than a second similarity between the plurality of pixel values and a second plurality of representative pixel values associated with a second output class predicted by the trained machine learning model.

15. The one or more non-transitory computer-readable media of any of clauses 11-14, wherein matching the first input image to the first mapping comprises determining that a first similarity between the plurality of pixel values and the first plurality of representative pixel values meets or exceeds a threshold.

16. The one or more non-transitory computer-readable media of any of clauses 11-15, wherein the instructions further cause the one or more processors to perform the steps of determining a lack of match between a second input image and the first mapping; and executing the trained machine learning model to generate a second prediction of a second output class for the second input image.

17. The one or more non-transitory computer-readable media of any of clauses 11-16, wherein determining the first set of images comprises filtering a second set of images included in a training dataset used to generate the trained machine learning model based on one or more thresholds for a set of confidence scores generated by the trained machine learning model from the second set of images.

18. The one or more non-transitory computer-readable media of any of clauses 11-17, wherein the first plurality of representative pixel values comprises a range of pixel values for each pixel location included in the first set of images.

19. The one or more non-transitory computer readable media of any of clauses 11-18, wherein the first plurality of representative pixel values comprises a plurality of summary statistics associated with a plurality of pixel values included in the first set of images.

20. In some embodiments, a system comprises one or more memories that store instructions, and one or more processors that are coupled to the one or more memories and, when executing the instructions, are configured to determine a first set of images associated with a first output class predicted by a trained machine learning model; generate a first aggregated representation of the first set of images, wherein the first aggregated representation comprises a first plurality of representative pixel values for a plurality of pixel locations in the first set of images; and generate a simplified representation of the trained machine learning model that includes a first mapping of the first aggregated representation to the first output class, wherein the first mapping indicates that the trained machine learning model predicts the first output class for one or more input images.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for simplifying a trained machine learning model, the method comprising:
   determining a first set of images associated with a first output class predicted by the trained machine learning model;
   generating a first aggregated representation of the first set of images, wherein the first aggregated representation comprises a first plurality of representative pixel values for a plurality of pixel locations included in the first set of images; and
   generating a simplified representation of the trained machine learning model that includes a first mapping of the first aggregated representation to the first output class, wherein the first mapping indicates that the trained machine learning model predicts the first output class for one or more input images.

2. The computer-implemented method of claim 1, further comprising storing, within the simplified representation of the trained machine learning model, a second mapping of a second aggregated representation of a second set of images to a second output class predicted by the trained machine learning model.

3. The computer-implemented method of claim 1, further comprising:
   matching an input image to the first mapping based on a plurality of pixel values included in the input image and the first plurality of representative pixel values in the first aggregated representation; and
   generating a prediction of the first output class for the input image based on the first mapping.

4. The computer-implemented method of claim 3, wherein matching the input image to the first mapping comprises determining that a first similarity between the plurality of pixel values and the first plurality of representative pixel values is higher than a second similarity between the plurality of pixel values and a second plurality of representative pixel values associated with a second output class predicted by the trained machine learning model.

5. The computer-implemented method of claim 3, wherein matching the input image to the first mapping comprises computing a vector similarity based on the plurality of pixel values included in the input image and the first plurality of representative pixel values included in the first aggregated representation.

6. The computer-implemented method of claim 3, wherein matching the input image to the first mapping comprises computing a deviation of each pixel value included in the plurality of pixel values from a corresponding representative pixel value included in the first plurality of representative pixel values.

7. The computer-implemented method of claim 1, wherein generating the first aggregated representation of the first set of images comprises populating a representative pixel value for each pixel location included in the plurality of pixel locations with one or more summary statistics associated with a set of pixel values for the pixel location from the first set of images.

8. The computer-implemented method of claim 1, wherein determining the first set of images comprises filtering a second set of images included in a training dataset used to generate the trained machine learning model based on one or more thresholds for a set of confidence scores generated by the trained machine learning model from the second set of images.

9. The computer-implemented method of claim 8, wherein the one or more thresholds comprise a minimum threshold for a first confidence score associated with the first output class and a maximum threshold for a second confidence score associated with a second output class.

10. The computer-implemented method of claim 1, wherein the trained machine learning model comprises a trained convolutional neural network.

11. One or more non-transitory computer-readable media storing instructions that, when executed by one or more processors, cause the one or more processors to perform the steps of:
- determining a first set of images associated with a first output class predicted by a trained machine learning model;
- generating a first aggregated representation of the first set of images, wherein the first aggregated representation comprises a first plurality of representative pixel values for a plurality of pixel locations included in the first set of images; and
- generating a simplified representation of the trained machine learning model that includes a first mapping of the first aggregated representation to the first output class, wherein the first mapping indicates that the trained machine learning model predicts the first output class for one or more input images.

12. The one or more non-transitory computer-readable media of claim 11, wherein the instructions further cause the one or more processors to perform the step of storing, within the simplified representation of the trained machine learning model, a second mapping of a logical representation of a second set of images to a second output class predicted by the trained machine learning model, wherein the logical representation comprises one or more conjunctions of a first set of pixel values included in a first image and a disjunction of the first set of pixel values and a second set of pixel values included in a second image.

13. The one or more non-transitory computer-readable media of claim 11, wherein the instructions further cause the one or more processors to perform the steps of:
- matching a first input image to the first mapping based on a plurality of pixel values included in the first input image and the first plurality of representative pixel values included in the first aggregated representation; and
- generating a first prediction of the first output class for the first input image based on the first mapping.

14. The one or more non-transitory computer-readable media of claim 13, wherein matching the first input image to the first mapping comprises determining that a first similarity between the plurality of pixel values and the first plurality of representative pixel values is higher than a second similarity between the plurality of pixel values and a second plurality of representative pixel values associated with a second output class predicted by the trained machine learning model.

15. The one or more non-transitory computer-readable media of claim 13, wherein matching the first input image to the first mapping comprises determining that a first similarity between the plurality of pixel values and the first plurality of representative pixel values meets or exceeds a threshold.

16. The one or more non-transitory computer-readable media of claim 13,
- wherein the instructions further cause the one or more processors to perform the steps of:
- determining a lack of match between a second input image and the first mapping; and
- executing the trained machine learning model to generate a second prediction of a second output class for the second input image.

17. The one or more non-transitory computer-readable media of claim 11, wherein determining the first set of images comprises filtering a second set of images included in a training dataset used to generate the trained machine learning model based on one or more thresholds for a set of confidence scores generated by the trained machine learning model from the second set of images.

18. The one or more non-transitory computer-readable media of claim 11, wherein the first plurality of representative pixel values comprises a range of pixel values for each pixel location included in the first set of images.

19. The one or more non-transitory computer readable media of claim 11, wherein the first plurality of representative pixel values comprises a plurality of summary statistics associated with a plurality of pixel values included in the first set of images.

20. A system, comprising:
- one or more memories that store instructions, and
- one or more processors that are coupled to the one or more memories and, when executing the instructions, are configured to:
  - determine a first set of images associated with a first output class predicted by a trained machine learning model;
  - generate a first aggregated representation of the first set of images, wherein the first aggregated representation comprises a first plurality of representative pixel values for a plurality of pixel locations in the first set of images; and
  - generate a simplified representation of the trained machine learning model that includes a first mapping of the first aggregated representation to the first output class, wherein the first mapping indicates that the trained machine learning model predicts the first output class for one or more input images.

* * * * *